United States Patent
Fukui

(10) Patent No.: US 9,055,236 B2
(45) Date of Patent: *Jun. 9, 2015

(54) INFORMATION PROCESSING APPARATUS AND OUTPUT SWITCHING CONTROL METHOD

(71) Applicant: Kabushiki Kaisha Toshiba, Tokyo (JP)

(72) Inventor: Kotaro Fukui, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,458

(22) Filed: May 22, 2014

(65) Prior Publication Data

US 2014/0253810 A1   Sep. 11, 2014

Related U.S. Application Data

(63) Continuation of application No. 12/171,963, filed on Jul. 11, 2008, now Pat. No. 8,767,123.

(30) Foreign Application Priority Data

Aug. 6, 2007   (JP) ................................. 2007-204609

(51) Int. Cl.
  *H04N 3/27* (2006.01)
  *H04N 5/268* (2006.01)
  *G06F 3/14* (2006.01)
  *H04N 21/41* (2011.01)
  *G09G 5/00* (2006.01)
  *G09G 5/36* (2006.01)

(52) U.S. Cl.
  CPC .............. *H04N 5/268* (2013.01); *G06F 3/1454* (2013.01); *G09G 5/006* (2013.01); *G09G 5/363* (2013.01); *G09G 2370/12* (2013.01); *H04N 21/4113* (2013.01)

(58) Field of Classification Search
  USPC ........................................................ 348/554
  See application file for complete search history.

(56) References Cited

U.S. PATENT DOCUMENTS

| 7,975,051 | B2 | 7/2011 | Saint Clair et al. |
| 2007/0153132 | A1 | 7/2007 | Jong |
| 2007/0165038 | A1 | 7/2007 | Chiba et al. |

FOREIGN PATENT DOCUMENTS

| JP | 07-192443 | 7/1995 |
| JP | 10-312178 | 11/1998 |
| JP | 2003-111166 | 4/2003 |
| JP | 2004-201215 | 7/2004 |

OTHER PUBLICATIONS

Japanese Patent Application No. 2007-204609, First Office Action, mailed Jun. 5, 2012, (with English Translation).

*Primary Examiner* — John Schnurr
*Assistant Examiner* — Christine Kurien
(74) *Attorney, Agent, or Firm* — Blakely Sokoloff Taylor & Zafman LLP

(57) ABSTRACT

According to one embodiment, an information processing apparatus includes a display, a connector which outputs a video signal, a display driver which controls output of a video signal to the display and connector, a monitoring unit which monitors whether a partner switches an input from a video signal output from the connector to another video signal, the partner being connected to the connector, and an output switching unit which instructs the display driver to switch the output destination of the video signal from the connector to the display when the monitoring unit detects that the input of the partner is switched to the other video signal.

9 Claims, 4 Drawing Sheets

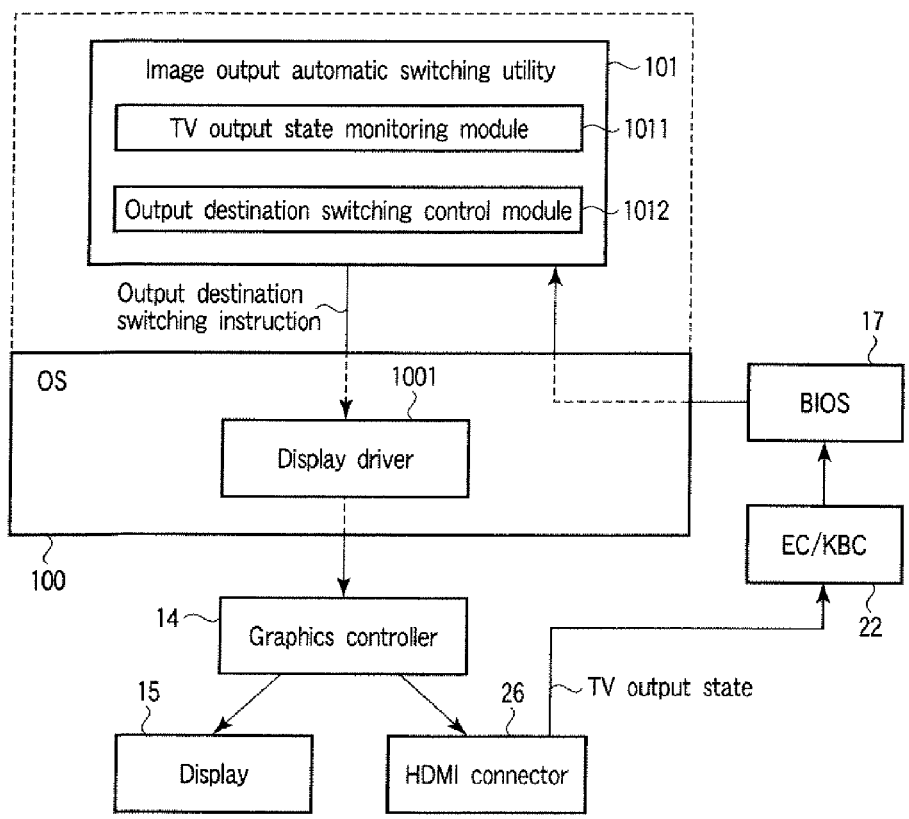
F I G. 4

INFORMATION PROCESSING APPARATUS AND OUTPUT SWITCHING CONTROL METHOD

CROSS-REFERENCE TO RELATED APPLICATIONS

This is a Continuation Application that is based upon and claims the benefit of priority from U.S. application Ser. No. 12/171,963, now U.S. Pat. No. 8,767,123, and is based upon and claims the benefit of priority from Japanese Patent Application No. 2007-204609, filed Aug. 6, 2007, the entire contents of both of which are incorporated herein by reference.

BACKGROUND

1. Field

One embodiment of the invention relates to a video signal output control technique that is preferably applied to a personal computer including a motion picture playback function capable of transmitting a video signal to a television broadcast receiver, for example.

2. Description of the Related Art

In recent years, personal computers including functions of permitting users to receive and view television broadcasting program data and play back audiovisual (AV) content stored on Digital Versatile Discs (DVDs) have become widely used. Thus, motion picture data (containing audio) can be utilized while the user is moving or in a position where he has gone to if the user carries a notebook personal computer that can be battery powered, for example.

Further, recently, the quality of a video motion picture is further enhanced and personal computers capable of playing back high-definition motion picture data stored in recording media complying with the High-Definition (HD) DVD standard start to be widely used. Generally, this type of personal computer has a mechanism of outputting a high-definition video signal to the exterior and, for example, the user can enjoy a high-definition video motion picture played back by the personal computer on a large-screen high-definition television broadcast receiver by connecting the personal computer to the large-screen high-definition television broadcast receiver when he is at home, for example.

The number of application configurations in which a plurality of electronic devices each having a function of playing back motion picture data and audio data are connected each other, for example, the above personal computer is connected to the television broadcast receiver is increased. Therefore, for example, various proposals for efficiently switching sources are made (for example, refer to Jpn. Pat. Appln. KOKAI Publication No. H7-192443).

Generally the television broadcast receiver includes a plurality of input systems and is designed to select a desired motion picture to be displayed by a simple operation. Therefore, in a case where the motion picture output destination of the personal computer connected to a television broadcast receiver is limited only to the television broadcast receiver, a display motion picture is kept disappeared until the user performs some operation if a to-be-input object of the television broadcast receiver is switched to a motion picture other than the motion picture from the personal computer even though the personal computer is being operated. At this time, the state in which the display motion picture is not displayed anywhere is maintained.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary diagram showing a function block associated with the video signal output switching control operation realized in the information processing apparatus of the embodiment;

DETAILED DESCRIPTION

Various embodiments according to the invention will be described hereinafter with reference to the accompanying drawings. In general, according to one embodiment of the invention, an information processing apparatus, includes a display, a connector which outputs a video signal, a display driver which controls output of a video signal to the display and connector, a monitoring unit which monitors whether a partner switches an input from a video signal output from the connector to another video signal, the partner being connected to the connector, and an output switching unit which instructs the display driver to switch the output destination of the video signal from the connector to the display when the monitoring unit detects that the input of the partner is switched to the other video signal.

Figure 1:
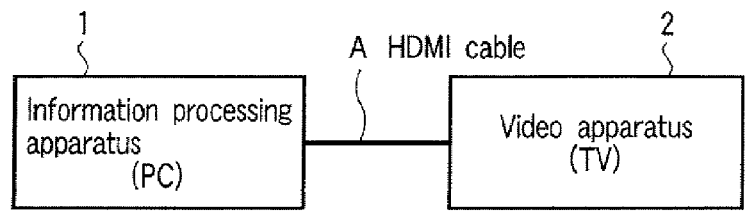
FIG. 1 is an exemplary diagram showing an application configuration of an information processing apparatus (personal computer) according to an embodiment of the invention.

In FIG. 1, one example of the application configuration of an information processing apparatus according to the present embodiment is shown. The information processing apparatus 1 is realized as a notebook personal computer (PC), for example.

In this case, as shown in FIG. 1, a case wherein the information processing apparatus 1 is connected to a video apparatus 2 via a High-Definition Multimedia Interface (HDMI) cable A is assumed. The video apparatus 2 is a large-screen high-definition television broadcast receiver (TV). In the information processing apparatus 1, various software programs (application programs) used to play back high-definition data are installed and the user can enjoy a high-definition motion picture played back by the application programs by use of the video apparatus 2 by connecting the same via the HDMI cable A. Further, the information processing apparatus 1 and video apparatus 2 which are connected via the HDMI cable A can transmit various types of commands to each other to control the operations of the connected partners.

Next, the mechanism of switching output destinations of a video signal provided by the information processing apparatus 1 (in response to a motion picture input switching operation of the video apparatus 2) at an adequate time is schematically explained with reference to FIGS. 2A and 2B.

Figure 2A:
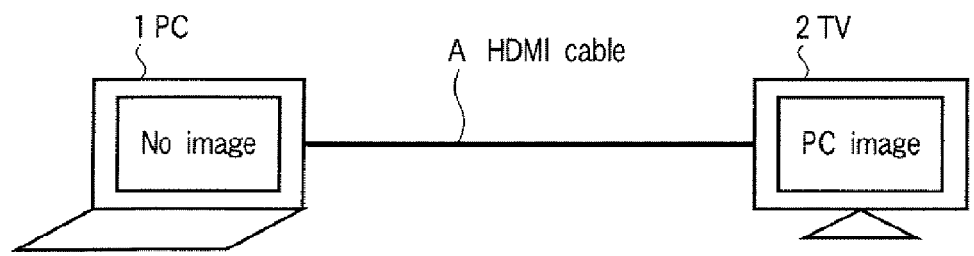
FIGS. 2A and 2B are exemplary views for schematically illustrating a video signal output switching control operation performed by the information processing apparatus of the embodiment.
Figure 2B:
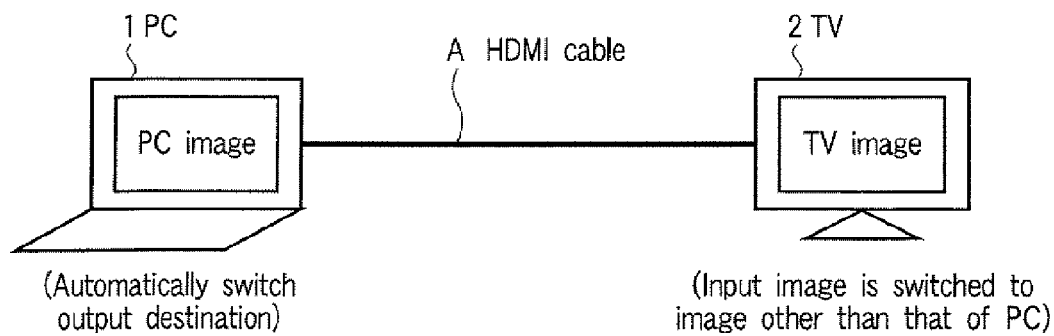

First, as shown in FIG. 2A, a case wherein a video motion picture played back by the information processing apparatus 1 is displayed by use of the video apparatus 2 (without displaying the motion picture on a display of the information processing apparatus 1 side) is assumed. Further, it is assumed that a motion picture input to the video apparatus 2 is switched to a motion picture other than the motion picture of the information processing apparatus 1 when the playback operation of AV content is terminated, for example.

In this case, for example, a video motion picture of a switched destination of a television broadcasting program is newly displayed on the video apparatus 2. However, if no operation is performed, the information processing apparatus 1 displays no motion picture although it is being operated. The display motion picture of the information processing apparatus does not appear anywhere. Therefore, a design is made to automatically switch a video signal output of the information processing apparatus 1 into a display mode as shown in FIG. 2B in the above case.

Figure 3:
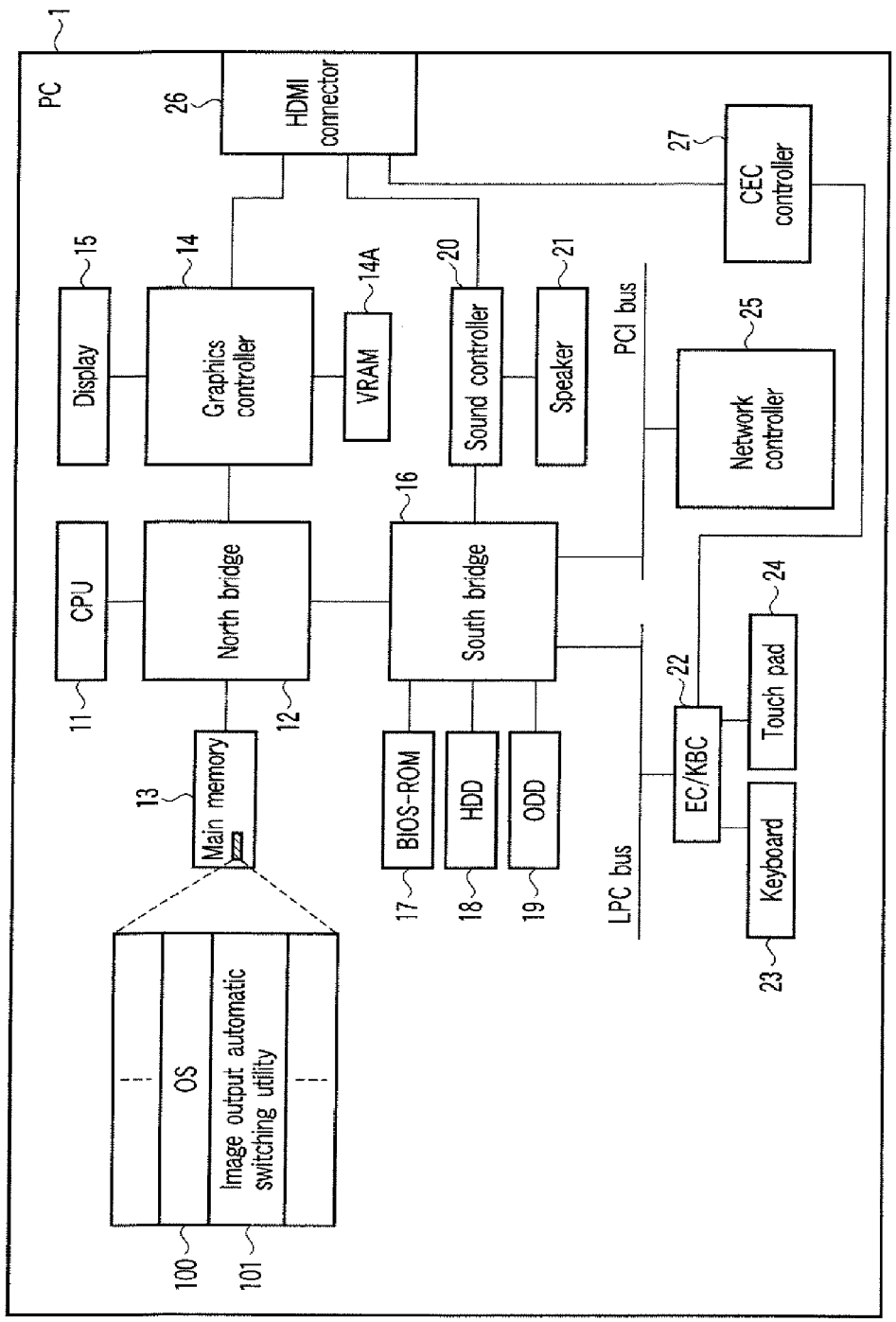
FIG. 3 is an exemplary diagram showing the configuration of the information processing apparatus of the embodiment.

FIG. 3 is an exemplary diagram showing the configuration of the information processing apparatus 1. As shown in FIG. 3, the information processing apparatus 1 includes a CPU 11, north bridge 12, main memory 13, graphics controller 14, VRAM 14A, display 15, south bridge 16, BIOS-ROM 17, hard disk drive (HDD) 18, magnet-optical disk drive (ODD) 19, sound controller 20, speaker 21, embedded controller/keyboard controller (EC/KBC) 22, keyboard 23, touch pad 24, network controller 25, high-definition multimedia interface (HDMI) connector 26, consumer electronics control (CEC: device-device bidirectional) controller 27 and the like.

The CPU 11 is a processor that controls the operations of the respective portions in the information processing apparatus 1. The CPU 11 executes an operating system (OS) 100 that is loaded from the HDD 18 into the main memory 13 and various programs, that is executed under the control of the OS 100, containing utilities and an application that deals with AV content. As one of the utilities, a motion picture output automatic switching utility 101 which will be described later is present. Further, the CPU 11 executes a basic input/output system (BIOS) stored in the BIOS-ROM 17. In the following explanation, the basic input/output system itself stored in the BIOS-ROM 17 is referred to as the BIOS 17 in some cases.

The north bridge 12 is a bridge device that connects the local bus of the CPU 11 with the south bridge 16. The north bridge 12 has a function of communicating with the graphics controller 14 via a bus and contains a memory controller that controls access to the main memory 13. The graphics controller 14 is a display controller that controls the display 15 on the information processing apparatus 1 side. The graphics controller 14 generates a video signal to be output to the display 15 based on motion picture data written into the VRAM 14A. Further, the graphics controller 14 has a function of outputting the video signal to the exterior from the HDMI connector 26.

The south bridge 16 is a controller that controls various devices on a PCI bus and LPC bus. Further the south bridge 16 is directly connected to the BIOS-ROM 17, HDD 18, ODD 19 and sound controller 20 and has a function of controlling the above portions. For example, television broadcasting program data and AV content and the like downloaded via the Internet are stored in the HDD 18 and an HD DVD that stores AV content is received in the ODD 19, for example. The sound controller 20 is a sound source controller that controls the speaker 21. The sound controller 20 has a function of outputting an audio signal to the exterior from the HDMI connector 26.

The EC/KBC 22 is a one-chip microcomputer obtained by integrating an embedded controller for power management and a keyboard controller that controls the keyboard 23 and touch pad 24. The network controller 25 is a communication device that communicates with an external network such as Internet, for example. The EC/KBC 22 is operated while the power source of the information processing apparatus 1 is kept off and monitors whether the power source ON operation is performed or not, for example. Then, if an event suggesting that the power source is turned on occurs, it performs the control operation to activate the information processing apparatus 1. Further, the EC/KBC 22 continuously supplies power to the CEC controller 27 while the power source of the information processing apparatus 1 is kept off.

The HDMI connector 26 is a terminal to which the HDMI cable A is detachably connected. The CEC controller 27 performs a data transmission control operation to transmit various commands for operation control via the HDMI connector 26 under the control of the EC/KBC 22. As one of the events for turning on the power source that is monitored by the EC/KBC 22, an event of receiving a power source on request command by the CEC controller 27 is present. The CEC controller 27 has a function of notifying a state change occurring in the controller itself as a status.

FIG. 4 is an exemplary diagram showing a function block associated with a video signal output destination switching control operation realized in the information processing apparatus 1 with the above configuration.

If an operation of switching a video input motion picture from the information processing apparatus 1 to another motion picture on the video apparatus 2 side, the state change is transmitted as a status to the information processing apparatus 1 via the HDMI cable. The status is guided into the information processing apparatus 1 via the HDMI connector 26 and received by the CEC controller 27 and reception of the command is notified to the EC/KBC 22.

When receiving the notification, the EC/KBC 22 generates a key code indicating the notification contents as input data addressed to the motion picture output automatic switching utility 101. The key code is transmitted to the OS 100 via the BIOS 17 and is further transmitted to the motion picture output automatic switching utility 101 from the OS 100.

The motion picture output automatic switching utility 101 is a program provided to automatically switch the output destination of the video signal from the HDMI connector 26 to the display 15 in response to a motion picture input switching operation on the video apparatus 2 side. The motion picture output automatic switching utility 101 is registered as a resident program that is always executed when the power source of the information processing apparatus 1 is set on.

The motion picture output automatic switching utility 101 that is the resident program has a TV output state monitoring module 1011 and an output destination switching control module 1012. When a notification of the status associated with the state change in the video apparatus 2 is received from the OS 100, the TV output state monitoring module 1011 checks whether or not an input motion picture is switched from the motion picture of the information processing apparatus 1 to another motion picture.

If the input motion picture is switched from the motion picture of the information processing apparatus 1 to another motion picture, that is, if it is detected that the input motion picture in the video apparatus 2 is switched from the motion picture of the information processing apparatus 1 to another motion picture, the TV output state monitoring module 1011 notifies the output destination switching control module 1012 to that effect.

The output destination switching control module 1012 receiving the notification gives an instruction of switching the output destination of the video signal from the HDMI connector 26 to the display 15 to the graphics driver 1001. As a result, it becomes possible to prevent occurrence of the state in which the information processing apparatus 1 displays nothing even though it is being operated and the display motion picture does not appear anywhere.

Figure 5:
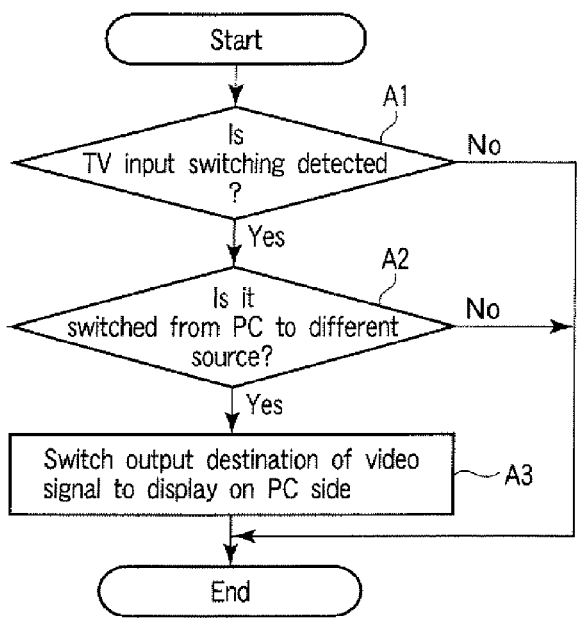
FIG. 5 is an exemplary flowchart showing the operation procedure of the video signal output switching control operation performed by the information processing apparatus of the embodiment.

FIG. 5 is an exemplary flowchart showing the operation procedure of the video signal output switching control operation performed by the information processing apparatus 1 of the embodiment.

When a certain state change occurs on the video apparatus 2 side, the TV output state monitoring module 1011 that receives a notification of a status indicating the state change from the OS 100 first checks whether or not the status is associated with the motion picture input switching operation on the video apparatus 2 side (block A1).

If it is associated with the motion picture input switching operation (YES in block A1), then the TV output state monitoring module 1011 checks whether or not the input motion picture is switched from the motion picture of the information processing apparatus 1 to another motion picture (block A2). If the input motion picture is switched from the motion picture of the information processing apparatus 1 to another motion picture (YES in block A2), the TV output state monitoring module 1011 notifies the output destination switching control module 1012 to that effect.

Then, the output destination switching control module 1012 receiving the notification gives an instruction of switching the output destination of the video signal from the HDMI connector 26 to the display 15 to the graphics driver 1001 (block A3).

Figure 6:
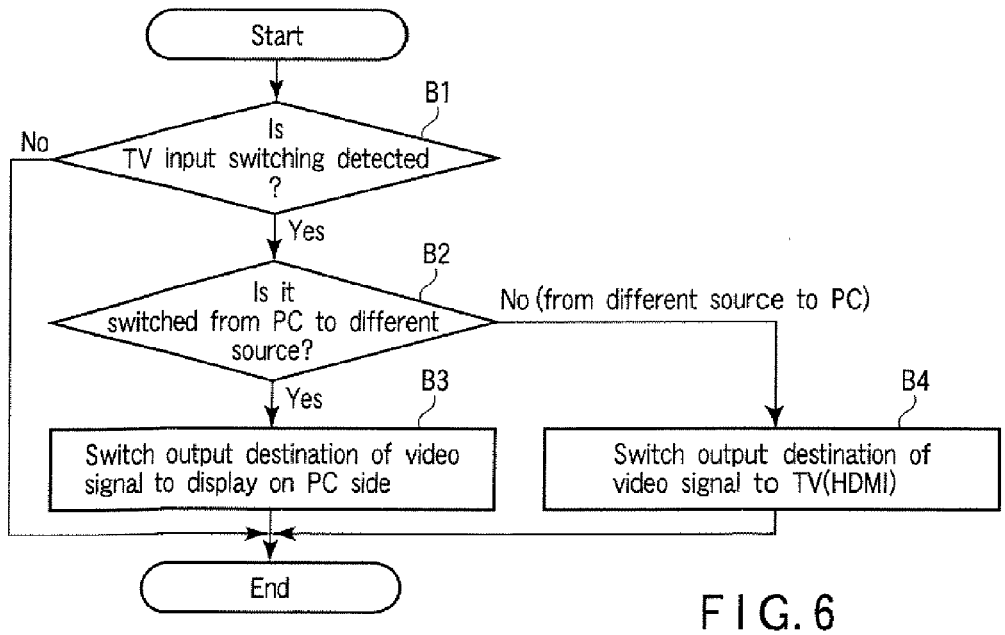
FIG. 6 is an exemplary flowchart showing the operation procedure of a video signal output switching control operation (modification) performed by the information processing apparatus of the embodiment.

On the other hand, if the input motion picture in the video apparatus 2 is switched from a motion picture other than the motion picture of the information processing apparatus 1 to the motion picture of the information processing apparatus 1, it seems that a command that requests that the output destination of the video signal is actively switched from the video apparatus 2 side to its own apparatus (video apparatus 2) is transmitted in addition to the status indicating the state change. Therefore, it is possible to switch the output destination of the video signal to the video apparatus 2 side at the time of reception of the command. However, it is useful to preparatively switch the output destination of the video motion picture to the video apparatus 2 side in the information processing apparatus 1 at the time of notification of the status indicating the state change without entirely depending on the control operation of the other apparatuses. FIG. 6 is an exemplary flowchart showing the operation procedure of a video signal output switching control operation performed by the information processing apparatus 1 of the embodiment in the above case.

When a certain state change occurs on the video apparatus 2 side, the TV output state monitoring module 1011 that receives a notification of a status indicating the state change from the OS 100 first checks whether or not the status is associated with a motion picture input switching operation on the video apparatus 2 side (block B1).

If it is associated with the motion picture input switching operation (YES in block B1), then the TV output state monitoring module 1011 checks whether or not the input motion picture is switched from the motion picture of the information processing apparatus 1 to another motion picture (block B2). If the input motion picture is switched from the motion picture of the information processing apparatus 1 to another motion picture (YES in block B2), the TV output state monitoring module 1011 notifies the output destination switching control module 1012 to that effect. Then, the output destination switching control module 1012 receiving the notification gives an instruction of switching the output destination of the video signal from the HDMI connector 26 to the display 15 to the graphics driver 1001 (block B3).

On the other hand, if the input motion picture is switched from a motion picture other than the motion picture of the information processing apparatus 1 to the motion picture of the information processing apparatus 1 (NO in block B2), the TV output state monitoring module 1011 notifies the output destination switching control module 1012 to that effect. Then, the output destination switching control module 1012 receiving the notification gives an instruction of switching the output destination of the video signal from the display 15 to the HDMI connector 26 to the graphics driver 1001 (block B4).

As described above, according to the information processing apparatus 1 of the present embodiment, the output destination of the video signal is switched at adequate timing in response to a motion picture input switching operation of the video apparatus 2 connected via the HDMI cable A.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a display;
an interface for outputting a video signal; and
at least one processor configured to:
monitor whether an operation state of another apparatus connected with the information processing apparatus by the interface changes from a first operation state to a second operation state based on a status received from the another apparatus, the first operation state being a state where the another apparatus inputs a second video signal output from a source other than the interface, the second operation state being a state where the another apparatus inputs a first video signal output from the interface, and
change the output destination of the video signal from the display to the interface when it is detected that the operation state of the another apparatus changes from the first operation state to the second operation state.

2. The information processing apparatus according to claim 1, wherein the interface is detachably connected to a high-definition-multimedia interface (HDMI) cable.

3. The information processing apparatus according to claim 1, wherein the at least one processor is configured to monitor whether the operation state of the another apparatus changes from the second operation state to the first operation state based on the status, and to change the output destination of the video signal from the interface to the display when it is detected that the operation state of the another apparatus changes from the second operation state to the first operation state.

4. An output switching control method of an information processing apparatus including a display and an interface for outputting a video signal, the method comprising:

monitoring whether an operation state of another apparatus connected with the information processing apparatus by the interface changes from a first operation state to a second operation state based on a status received from the another apparatus, the first operation state being a state where the another apparatus inputs a second video signal output from a source other than the interface, the second operation state being a state where the another apparatus inputs a first video signal output from the interface; and changing an output destination of the video signal from the display to the interface when it is detected that the operation state of the another apparatus changes from the first operation state to the second operation state.

5. The output switching control method of the information processing apparatus according to claim 4, the method further comprising:

monitoring whether an operation state of the another apparatus changes from the second operation state to the first operation state based on the status; and switching the output destination of the video signal from the interface to the display when it is detected that the operation state of the another apparatus changes from the second operation state to the first operation state.

6. A method comprising:

monitoring, by an information processing apparatus including a display and an interface, whether a state of a second apparatus connected with the information processing apparatus by the interface changes from a first state to a second state, the first state being a state where the second apparatus inputs a second video signal output from a source other than the interface, the second state being a state where the second apparatus inputs a first video signal output from the interface; and automatically changing, by the information processing apparatus, an output destination of the first video signal from the display to the interface upon detecting that the state of the second apparatus changes from the first state to the second state.

7. The method according to claim 6 further comprising:

monitoring, by the information processing apparatus, whether the state of the second apparatus changes the second state to the first state; and automatically changing, by the information processing apparatus, an output destination of the video signal from the interface to the display upon detecting that the state of the second apparatus changes from the second state to the first state.

8. The method according to claim 6, wherein the interface of the information processing apparatus is a high-definition-multimedia interface (HDMI) connector.

9. The method according to claim 6, wherein the second apparatus is a television.

* * * * *